March 17, 1959
L. A. SCHMIDT ET AL
2,877,960
COUNTER ROLL STRIPPER
Filed Aug. 9, 1954
9 Sheets-Sheet 8
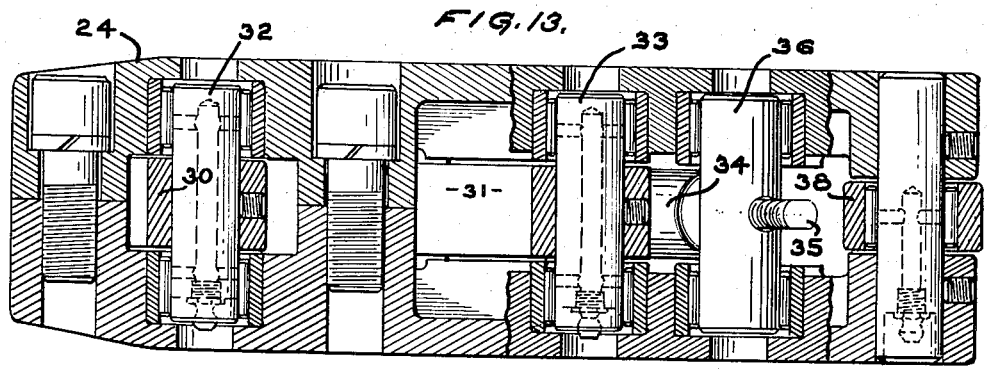
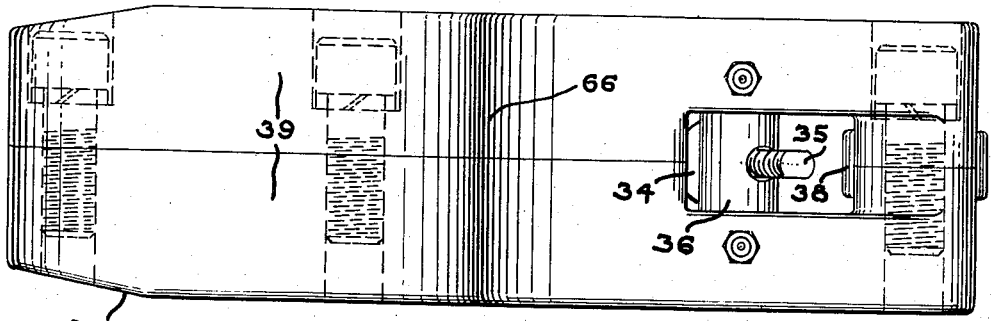
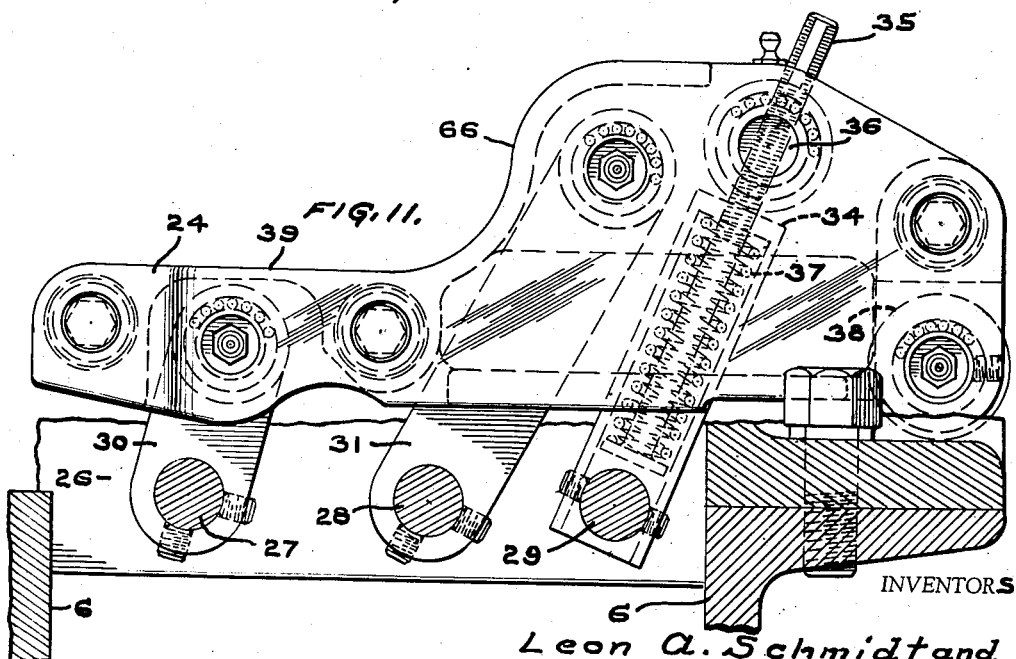
INVENTORS
Leon A. Schmidt and
Leonard Rockstrom
BY
Thomas W. J. Clark
ATTORNEY

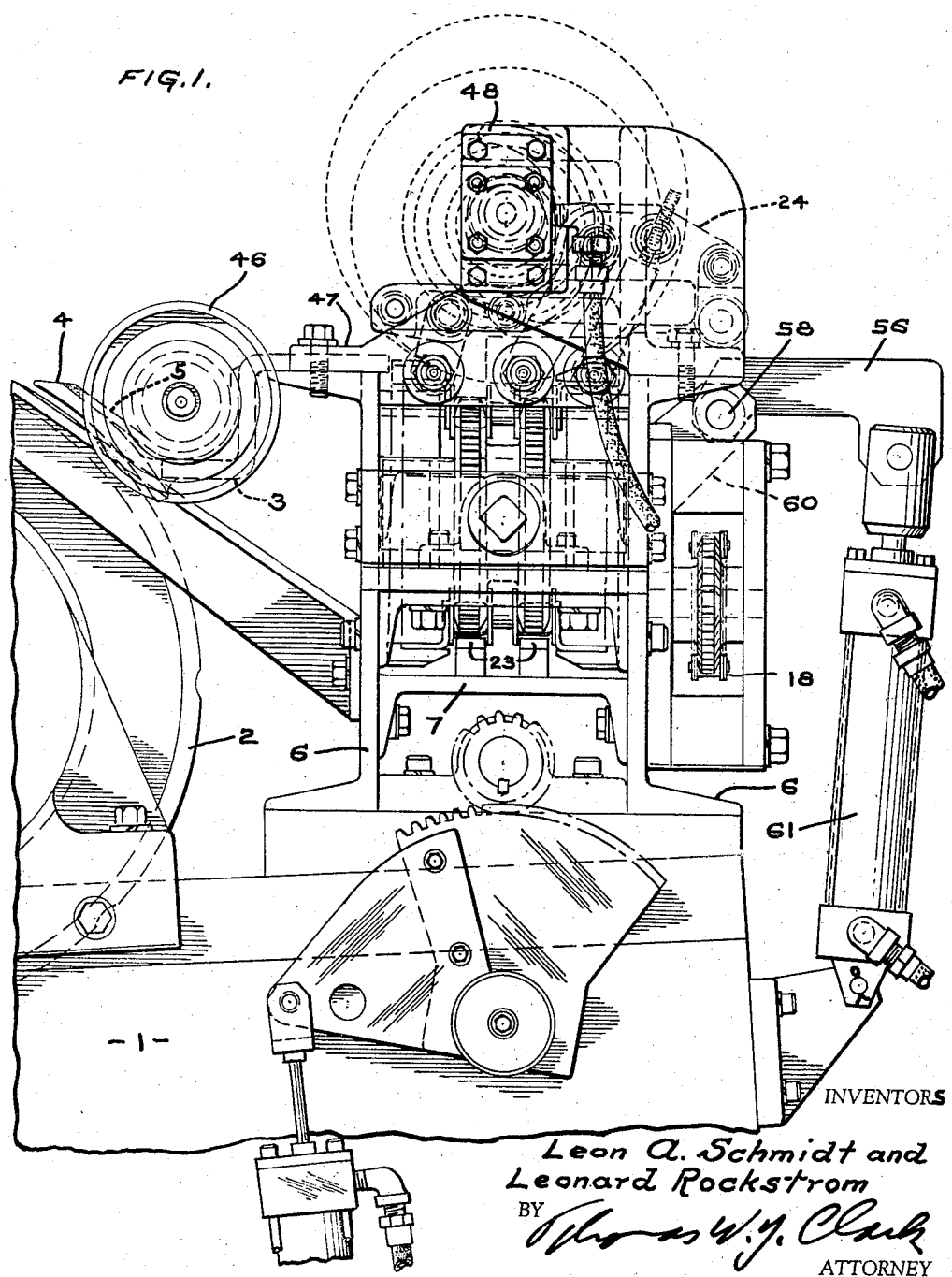

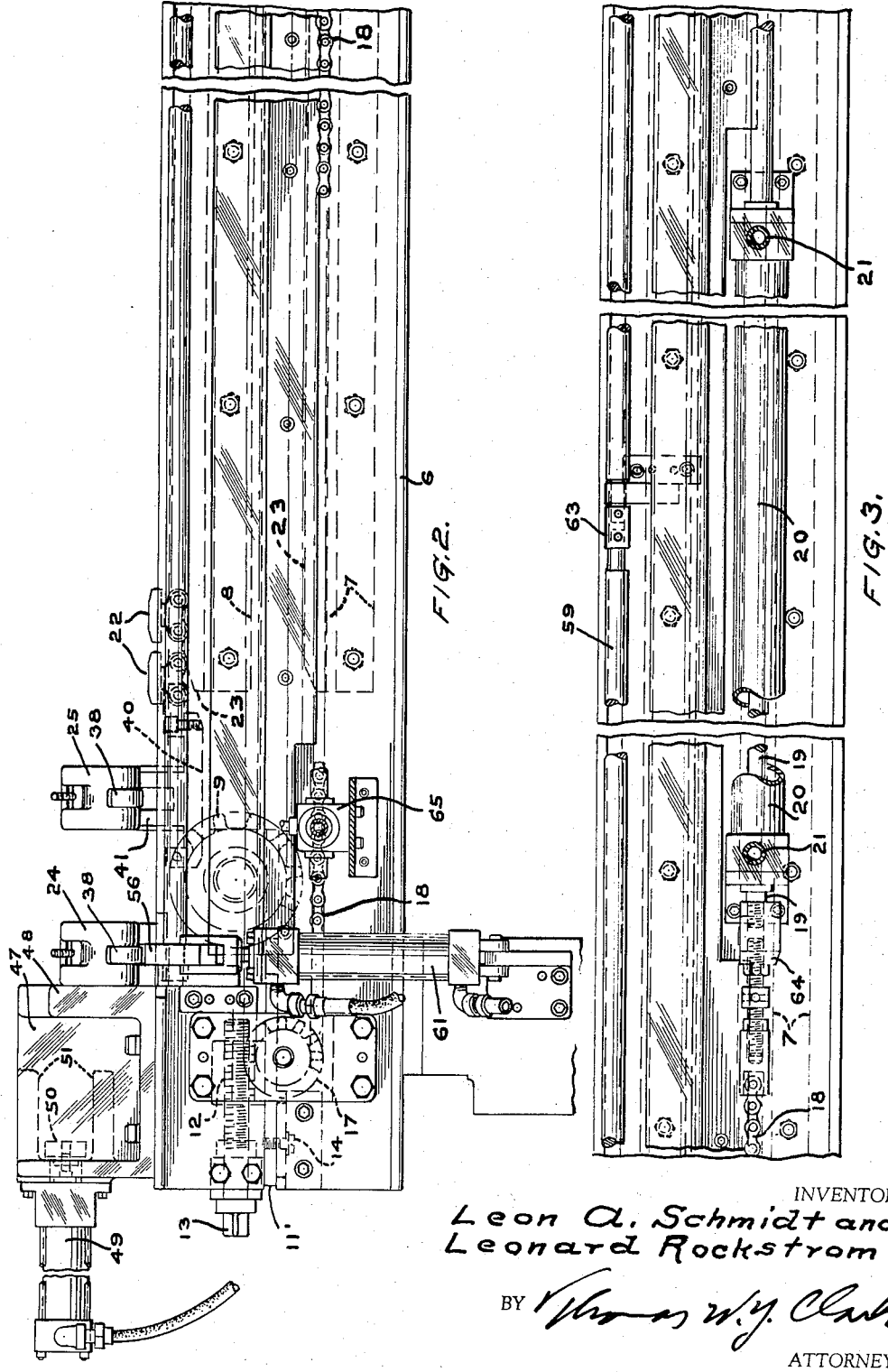

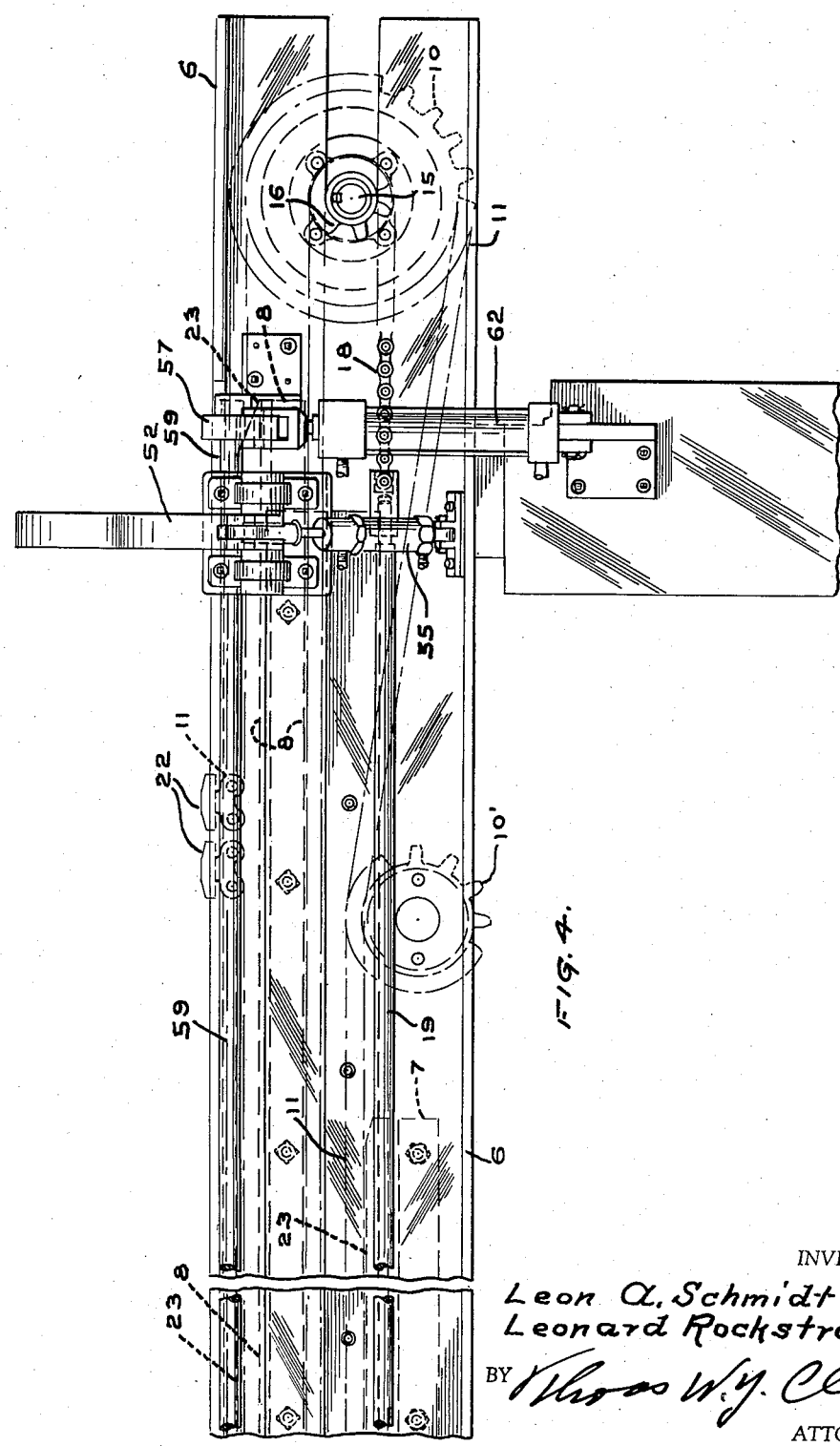

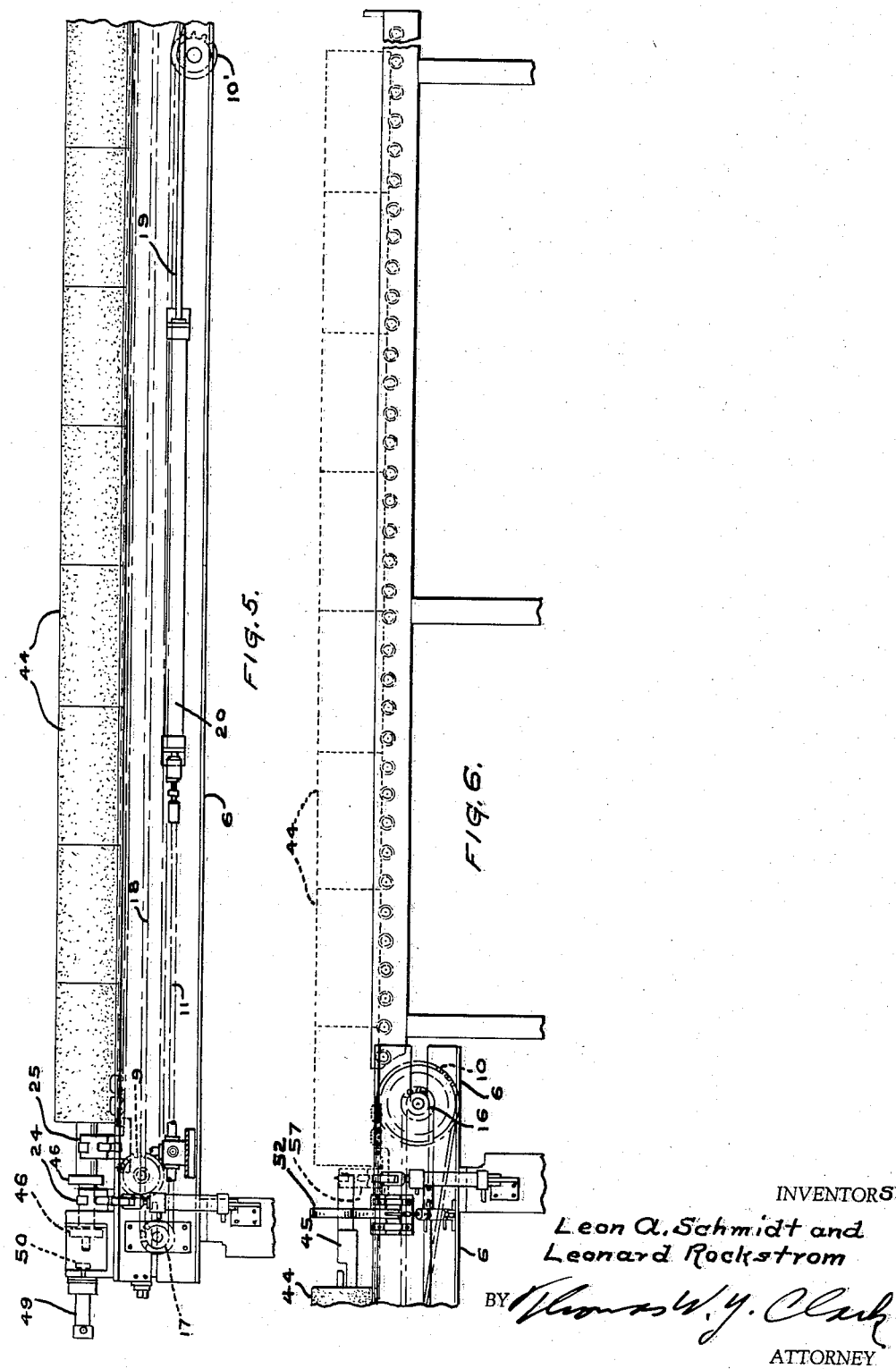

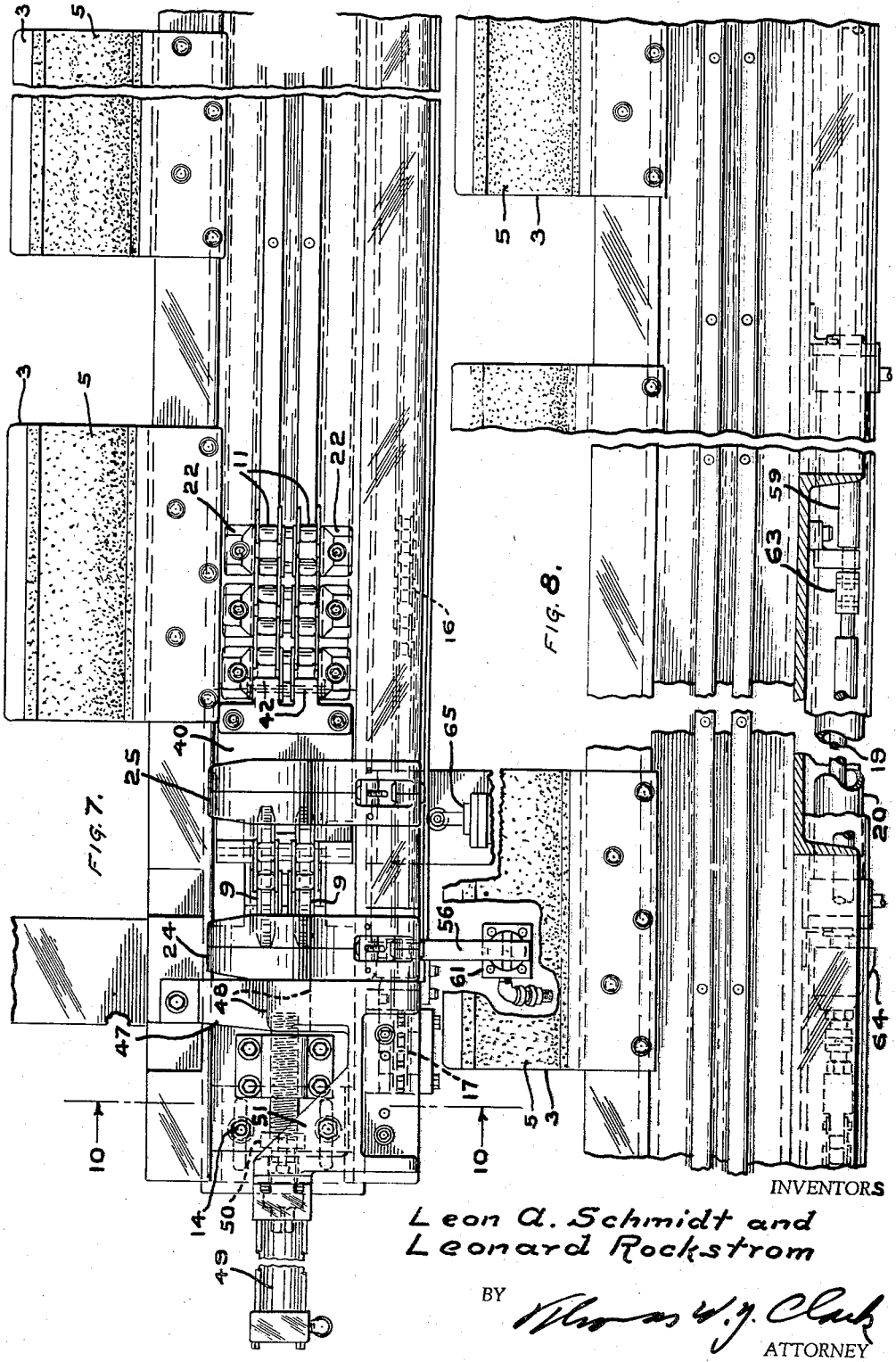

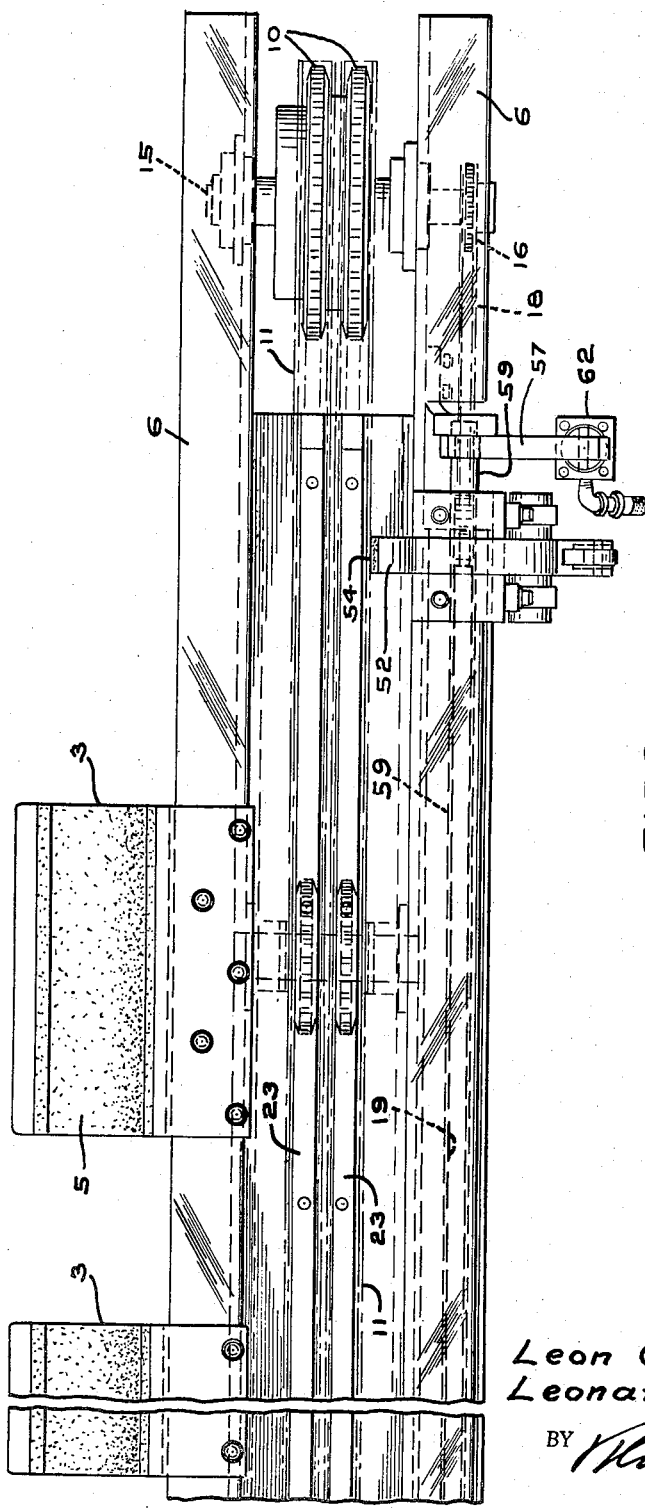

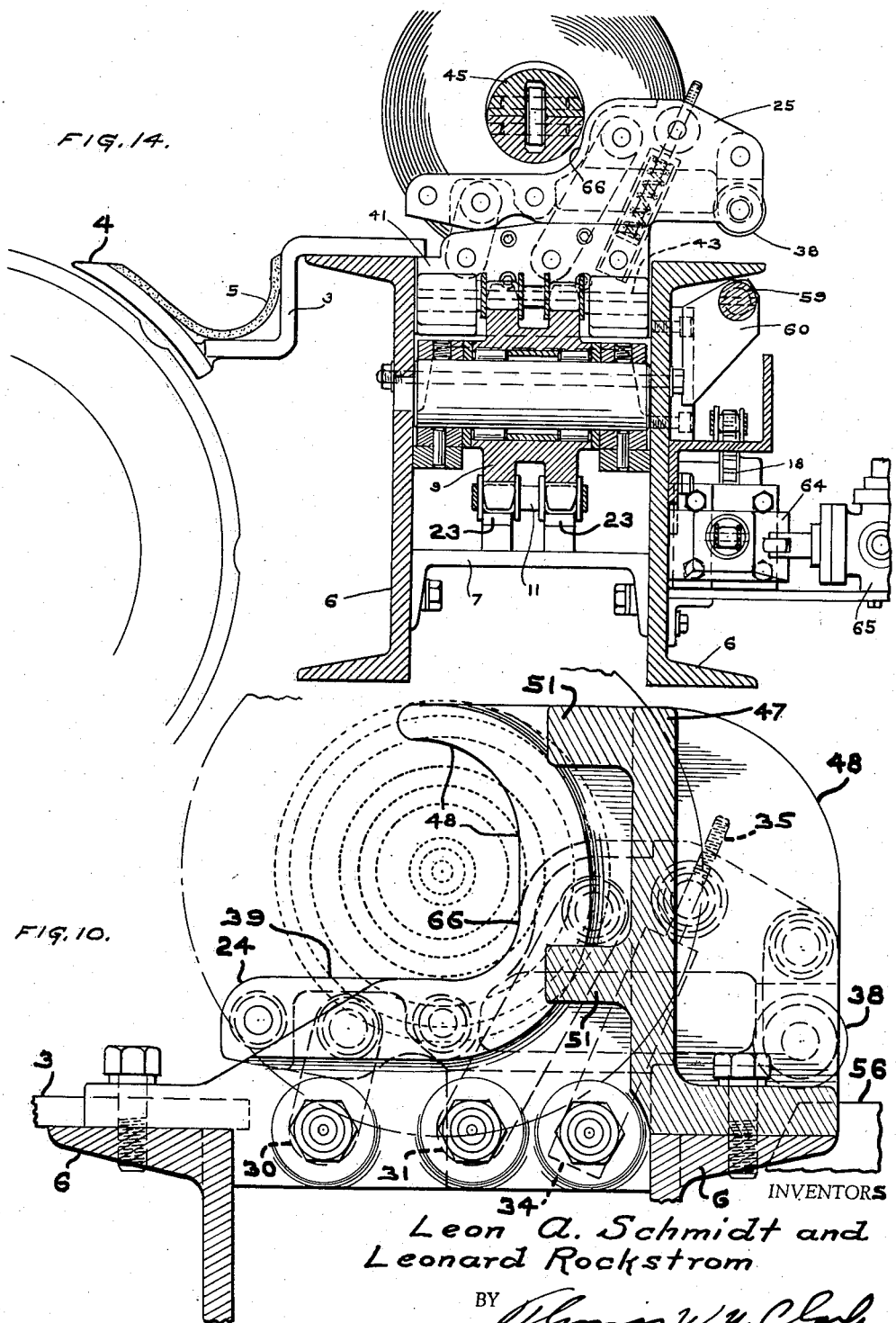

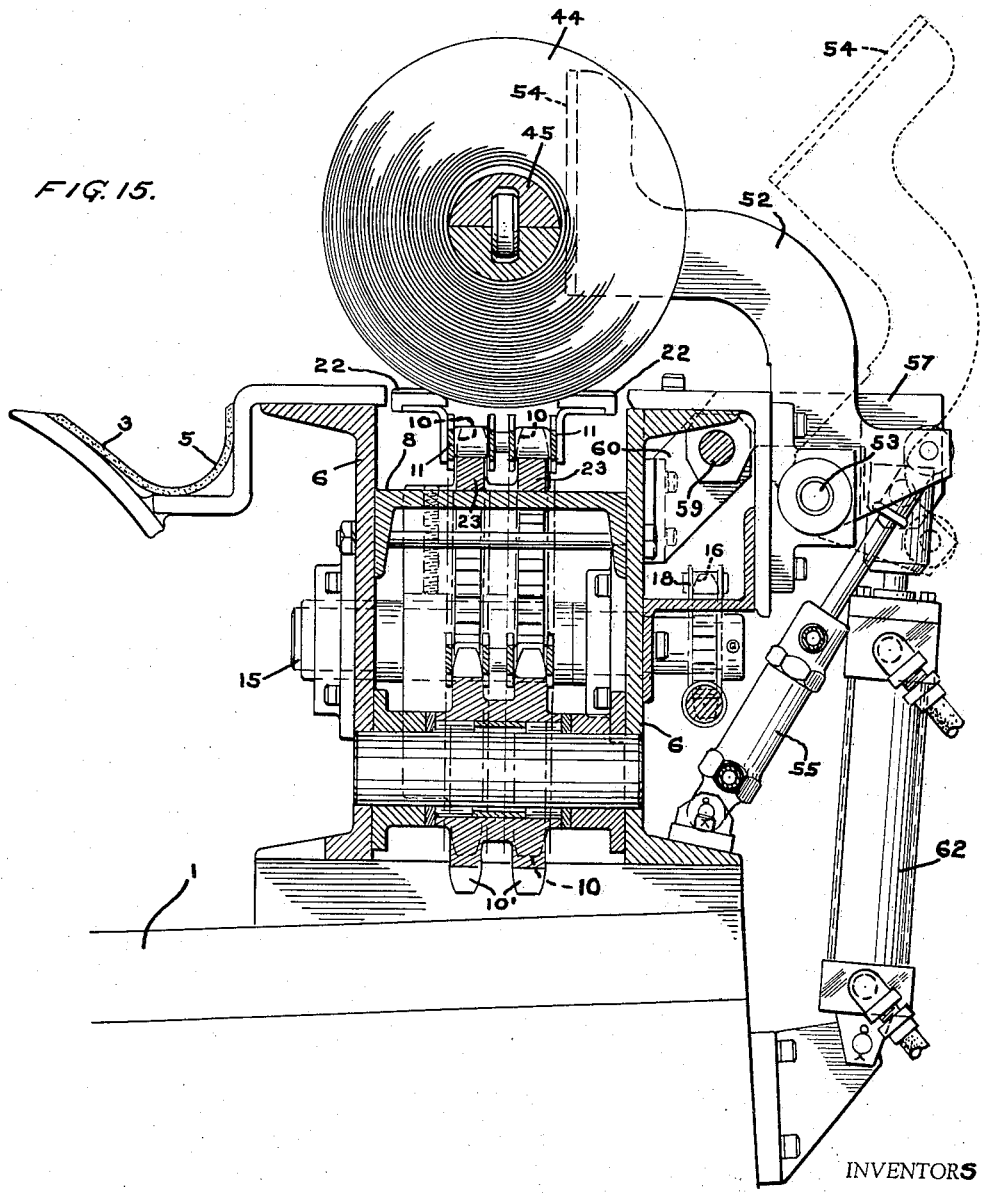

United States Patent Office 2,877,960
Patented Mar. 17, 1959

2,877,960

COUNTER ROLL STRIPPER

Leon A. Schmidt, Staten Island, and Leonard Rockstrom, Manhassett, N. Y., assignors to Cameron Machine Company, Brooklyn, N. Y., a corporation of New York Application August 9, 1954, Serial No. 448,579

11 Claims. (Cl. 242—68)

This invention relates to an apparatus for stripping a web roll from a rewind shaft and returning the shaft to the winding machine for the winding of further rolls thereon.

In the rewinding of paper and other materials from mill rolls, it is at times desirable to rewind them into rolls of large diameter and a machine for that purpose is illustrated in the copending application of Felix Saco and Leonard Rockstrom, Serial No. 390,002 filed November 3, 1953, Patent No. 2,743,879. At other times it is desirable to rewind the large mill roll into a group of counter rolls of considerably smaller diameter and the purpose of the present invention is to strip those counter rolls from the rewind shaft and to return the shaft to the rewind machine for the winding of further counter rolls thereon. The apparatus of this invention can therefore be placed in front of the rewind machine of the above application and that machine can be operated to wind counter rolls for stripping by the machine of the instant invention.

Among the objects of the present invention are to make a counter roll stripper that will sustain the rewind shaft after the counter roll has been stripped from it. Another object of the invention is to provide a rewind shaft stripper that will receive the counter roll thereon in accurate position for stripping upon its mechanical delivery to the stripper. Another object of the invention is to provide a means to hold the rewind shaft against axial movement, such means readily releasing the shaft after stripping. Another object of the invention is to provide a rewind shaft handling mechanism which returns the shaft to the ready trough for feeding again to the valley between the rewind rolls of the rewind machine. Another object of the invention is to provide tilting ways at each end of the rewind shaft after the roll has been stripped therefrom and to coordinate the movement of those ways so that they evenly roll the rewind shaft to the ready trough. Another object of the invention is to provide a rewind shaft stripper and handler that will be economical to produce and rugged in use and which will require a minimum of attention for its continuous operation.

Other objects and advantages of the invention will be apparent from the following description and the accompanying drawings forming a part hereof and in which:

Figure 1 is a left hand elevational view of the machine.

Figure 2 is a front elevational view of the left end of the machine. Figure 3 is a similar view of the intermediate portion thereof. Figure 4 is a similar view of the right hand end of the machine.

Figure 5 is a front elevational view of the left hand end of the machine on smaller scale with certain parts omitted and Figure 6 is a similar view of the right hand end of the machine.

Figure 7 is a plan view of the left hand end of the machine. Figure 8 is a similar view of the intermediate portion thereof and Figure 9 is a similar view of the right hand end of the machine.

Figure 10 is a fragmentary sectional view on line 10—10 of Figure 7.

Figure 11 is a transverse sectional view between the shaft head holder and the fixed shaft support. Figure 12 is a plan view of the shaft support shown in Figure 11.

Figure 13 is a horizontal sectional view of the shaft support of Figure 11.

Figure 14 is a transverse sectional view of the machine showing the travelling shaft support.

Figure 15 is a transverse sectional veiw of the machine immediately beyond, to the left, of the travelling shaft support.

In the drawings similar numerals refer to similar parts throughout the several views.

The end of the rewind machine with its base support is shown at 1 and the front rewind roll at 2 with the ready trough being shown at 3 with its rearwardly projecting open end 4 in close proximity to the front rewind roll 2 of the rewind machine. This ready trough is preferably provided with liners 5 to avoid injury to the rewind shaft. The stripper is mounted on beams 6 attached to the base 1 of the rewind machine. These beams are connected by further beams 7 and 8 passing longitudinally substantially the length of the machine. At the left end of the machine are double sprockets 9 and corresponding sprockets 10 at the right end which carry chain 11, this chain being continuous around these sprockets, except for the carriage on which the stripping shaft support is placed. Smaller sprockets 10′ return the under run of the chain to parallel after passing around the large sprockets 10. Sprockets 9 are mounted on a carriage 11′ which includes a slack take up mechanism 12 controlled by screw 13 in which the take up mechanism is maintained in adjusted position by screws 14.

At the right hand side the large sprockets 10 are mounted on shaft 15 which extends through beams 6 and has on its front side further sprocket 16. In line with sprocket 16 on the front of beam 6 at the left end of the machine is a further sprocket 17 and around these sprockets pass chain 18 which makes a continuous upper run and its lower run has therein the rod 19 of a double acting piston which operates in cylinder 20 attached to the face of beam 6. The piston may be operated in either direction by fluid admitted to the cylinder at either end through openings 21.

The chain 11 has on its upper run web roll supports 22 which project from the sides of the chain substantially to the sides of the stripper frames or beams 6. The rollers of the chain roll upon the ways 23 mounted on the longitudinal transverse connecting beam 8 as shown in Figure 15. The supporting members 22 therefore receive the web roll and through movements of the chain carry that roll to the right end of the machine upon admitting fluid to the right hand end of cylinder 20. Because of the difference in diameter of the sprockets 16 and 10 the short length of the stroke of the piston provided by cylinder 20 is adequate to move the carriage 22 for the web roll the complete length of the machine.

Shaft supports 24 and 25 are provided at the left end of the machine. These shaft supports preferably are a trifle below the shaft within the web roll when that roll is moved to the stripper. Shaft support 24 shown in Figures 11, 12 and 13 is mounted on two bars 26 extending between the beams 6. These bars have bearing rods 27, 28 and 29 passing horizontally therethrough. The bearing rods 27 and 28 have thereon links 30 and 31 which have passing through their upper ends further bearing rods 32 and 33 which maintain the shaft support substantially horizontal and as shown in Figure 11, allow its movement up and to the left. The bearing rod 29 supports spring cylinder 34 containing spring held piston 35 longitudinally adjustable in bearing rod 36 in the shaft support. The cylinder contains compression spring 37. When the shaft support 24 is elevated by upward pressure to the left, as shown in Figure 11 upon its roller 38, the shaft support moves to the left and is elevated to slope its surface 39, forming a rollway, to roll therefrom the rewind shaft after the web roll has been removed therefrom. The upward inward movement of the shaft support does not pass the spring piston plunger beyond its center between bearing rods 36 and 29 so that with the release of the upward inward pressure on the shaft support 24 the spring 37 returns the shaft support to the position shown in Figure 11.

A shaft support 25 is made identical to shaft support 24 but it is mounted in carriage 40 on the integrally extending upright 41 therein. Carriage 40 has extensions 42 through which pintles 43 pass to connect the carriage into the chain 11, so that with the reciprocation of the chain over the length of the stripper, shaft support 25 is likewise reciprocated.

The web roll 44 is rolled to its supporting members 22 by the Shaft Injector for Rewind Machine shown in an application filed substantially simultaneously herewith by Charles Aaron and Leonard Rockstrom, Serial No. 448,580, filed August 9, 1954 and when it is rolled upon the stripper it has therein the rewind shaft 45 upon which the roll was and is wound. The rewind shaft is preferably of the collapsible type which are old and it forms no part of this invention. One end of the shaft preferably has a double flanged or spool shaped bearing 46 forming the head of the shaft and by means of which the shaft is guided to accurately axially align it in rolling the shaft to the rewind rolls. The stripper of this invention has a shaft holding mechanism 47 the end 48 of which is in the shape of a reversed C facing toward the rewind rolls and the opening ends of the C are of a size to receive therebetween the rewind shaft, with one flange of the head of the spool being to the left of the C as this member is shown in Figures 2 and 5. See Figure 10 for the C shape. The C thereby forms a clamp to hold the shaft against axial movement but it is also open to the rear to allow the shaft to be rolled or pushed from the clamp after the web roll has been stripped from it. A hydraulic cylinder 49 with a plunger 50 is provided at the end of the holding mechanism, opposite C, and pressure exerted by the plunger 50 collapses the collapsible rewind shaft 45 to allow the withdrawal of the web roll from it. This shaft as collapsed is illustrated in Figures 14 and 15. Webs 51 above and below the plunger head 50 reinforce the attachment of the cylinder mounting to the framework holding the shaft end.

At the opposite end of the stripper is an upstanding pivoted bracket 52 pivoted at 53 to the side of the stripper frame. This bracket has a head 54 contacting the rewind shaft 45 when the web roll is rolled upon the machine to accurately position the right hand end of the web roll on the supporting members 22. The C member 48 positions the headed end of the shaft accurately upon the supporting members. After the web roll has been accurately positioned the bracket 52 is withdrawn outwardly beyond the web roll by means of the fluid cylinder 55.

Shaft supports 24 and 25 are moved rearwardly and tilted by levers 56 and 57 pivoted respectively at 58 and 59 on brackets 60 projecting from the front of the machine. These levers are operated simultaneously by fluid cylinders 61 and 62 respectively. The pivot rod 59 for these levers serves as a synchronizing shaft, being pinned to the respective levers and with a coupling at 63 to assure the synchronized movements of the two levers 56 and 57 upon the admission of fluid to their respective cylinders.

Near the left end of piston rod 19 as it there connects with sprocket chain 18, a cam 64 is placed which throws valve 65 as shown in Figures 2 and 14 at the precise time that the web roll is released from the end of shaft 45.

Throwing of this valve 65 thereby stops the movement of the driving piston and its attached chains and shaft support 25 precisely under the free end of the rewind shaft. The shaft support 25, after the web roll has been placed upon the stripper with that support in the position shown in Figure 2 is moved to the right, pushing the web roll off the rewind shaft with the web roll support 22 carrying the roll and by means of the cam 64 and valve 65 the right hand movement of the roll supports 22 and the shaft support 25 is stopped at the exact instant that the web roll is free from the rewind shaft 45. At this precise position the shaft support 25 is immediately over the lever 57 so that with the elevation of that lever and its corresponding lever 56 acting on shaft 45, in each instance against rolls 38 in both shaft supports, these shaft supports are simultaneously pushed to the rear of the machine and tilted up. The shoulders 66 on the shaft supports pushing the shaft head from the C clamp 48 with force, beyond the pull of gravity of the shaft down ways 39 if required. This tilting and rearward movement of the shaft supports rolls the freed shaft to the ready trough 3 from which position it is ready to be fed again to the rolls of the rewind machine for receiving thereon a further web roll.

The operation of the apparatus of the invention will be apparent from the above description and it will also be apparent that a rugged, accurately operating mechanism has been provided for easily stripping the web rolls from the rewind shafts and returning those shafts for further use to the rewind machine.

It will be apparent that many modifications in the detail of the construction may be made without departing from the invention.

What is claimed as new and is desired to be secured by Letters Patent is:

1. Apparatus for handling a web roll wound on a rewind shaft having a headed and a free end, a longitudinally movable carriage to support the roll, means to engage the shaft headed end to hold the shaft against axial movement shaft rollway means adjacent the shaft headed end to support the same horizontally after the roll is stripped from the shaft, shaft rollway movable means closely adjacent and beneath the shaft, between the shaft headed end and roll, to strip the roll from the shaft, over its free end, and to support the free shaft end when the roll is stripped therefrom, whereby, after the stripping of the roll from the shaft, the shaft may be rolled from the shaft rollway means and the shaft rollway movable means, said headed end engaging means being open at one side to release the shaft therefrom when rolled from said rollway means.

2. Apparatus for handling a web roll wound on a rewind shaft having a headed and a free end, a longitudinally movable carriage to support the roll, means to engage the shaft headed end to hold the shaft against axial movement shaft rollway means adjacent the shaft headed end to support the same horizontally after the roll is stripped from the shaft, and unitary shaft rollway means closely adjacent and beneath the shaft travelling with the roll to strip the roll from the shaft over its free end, and to support the shaft free end above the carriage, whereby, after the stripping of the roll from the shaft, the shaft may be rolled from the shaft rollway means and the unitary shaft rollway means, said headed end engaging means being open at one side to release the shaft therefrom when rolled from said rollway means.

3. The apparatus of claim 2 including means to stop the travelling of the unitary means prior to passing the shaft free end.

4. A rewind shaft stripper and handler comprising means for supporting a web roll wound on a rewind shaft having a headed and a free end, means to engage the shaft headed end to hold the shaft against axial movement, means to strip the roll from the shaft, over its free end, means, including said stripping means, to support the shaft above the roll supporting means, a ready trough for shafts to be fed to a rewinding machine substantially parallel to and beneath the roll supporting means, ways between said trough and last named means, means to tilt said shaft support means to roll the shaft over said ways to the ready trough.

5. A rewind shaft stripper and handler comprising means for supporting a web roll wound on a rewind shaft having a headed and a free end, means to engage the shaft headed end to hold the shaft against axial movement, means to strip the roll from the shaft, over its free end, means, including said stripping means, to support the shaft above the roll supporting means, a ready trough for shafts to be fed to a rewind machine substantially parallel to and beneath the shaft supporting means, ways adjacent and beneath said shaft supporting means extending to and sloping downwardly toward said trough, means to release the shaft from the head engaging means and the shaft supporting means, to roll it from the shaft supporting means over the ways to the ready trough.

6. A rewind shaft stripper and handler comprising a reciprocating carrier for supporting a web roll wound on a shaft having a headed end and a free end, means to engage the shaft headed end to hold the shaft against axial movement, said reciprocating carrier having means moving therewith to strip the roll from the shaft, over its free end, means including said stripping means to support the shaft above the carrier, a ready trough for shafts to be fed to a rewind machine substantially parallel to and beneath the carrier, ways between said trough and carrier, and means, including said shaft support means to release the shaft from the head engaging means and the means supporting the shaft above the carrier to said ways and the ready trough.

7. A rewind shaft stripper and handler comprising means for supporting a web roll wound on a shaft having a headed end and a free end, means to engage the shaft headed end to hold the shaft against axial movement, means to strip the roll from the shaft over its free end, tiltable way means, including said stripping means, to support the shaft above the roll supporting means, a ready trough for shafts to be fed to a rewind machine substantially parallel to, adjacent and beneath the roll supporting means, means to tilt said tiltable way means to release the shaft from the head engaging means and over the way means to the ready trough.

8. The rewind shaft stripper and handler of claim 7 including means in each tiltable way means to restore the tiltable way means to shaft holding position upon the withdrawal of the tilting means.

9. A rewind shaft stripper and handler comprising means for supporting a web roll wound on a shaft having a headed end and a free end, means to engage the shaft headed end to hold the shaft against axial movement, means to strip the roll from the shaft over its free end, a ready trough adjacent, parallel to and to the rear of the roll supporting means, rearwardly movable tiltable way means, including said stripping means, to support the shaft adjacent each end above the roll supporting means, each tiltable way means having a shoulder forward of its shaft supporting position, means to move said tiltable way means rearwardly, their shoulders pushing the shaft from the head engaging means, and to tilt the way means rearwardly, to release the shafts to the ready trough.

10. A rewind shaft stripper and handler comprising a reciprocating carrier for supporting a web roll wound on a shaft having a headed end and a free end, means to engage the shaft headed end to hold the shaft against axial movement, said reciprocating carrier having means moving therewith to strip the roll from the shaft, over its free end, means including said stripping means to support the shaft above the carrier at each end of the shaft, a ready trough for shafts to be fed to a rewind machine substantially parallel to, adjacent and beneath the carrier, means including said shaft supporting means to release the shaft from the head engaging means and to transfer the shaft to the ready trough, and means to coordinate the movements of the shaft transfer means at each end of the shaft.

11. Apparatus for separating a web roll from the shaft upon which it is wound comprising means to hold the shaft against axial movement at one end, means to move the roll from the shaft held end and to strip the roll from the shaft over the other end, and including said stripping means to engage the shaft at each end, and release the shaft for reuse, the engaging means for one end of the shaft being carried by the roll moving means to travel with the roll during stripping.

References Cited in the file of this patent

UNITED STATES PATENTS

| | | |
|---|---|---|
| 1,979,310 | Berry | Nov. 6, 1934 |
| 2,292,866 | Cann | Aug. 11, 1942 |